(12) United States Patent
Li et al.

(10) Patent No.: US 7,502,967 B1
(45) Date of Patent: Mar. 10, 2009

(54) IDENTIFYING AN OBJECT IN A DATA FILE THAT CAUSES AN ERROR IN AN APPLICATION

(75) Inventors: Jun Li, Palo Alto, CA (US); Gary L. Vondran, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 11/263,357

(22) Filed: Oct. 31, 2005

(51) Int. Cl.
*G06F 11/00* (2006.01)
(52) U.S. Cl. .......................................... 714/38; 717/124
(58) Field of Classification Search ...................... None
See application file for complete search history.

(56) References Cited

U.S. PATENT DOCUMENTS

| | | | |
|---|---|---|---|
| 6,189,142 B1 * | 2/2001 | Johnston et al. ............ 717/125 |
| 6,460,126 B1 * | 10/2002 | Spilo et al. ................. 711/209 |
| 6,708,288 B1 * | 3/2004 | Ziegler et al. ................ 714/15 |
| 2003/0056200 A1 | 3/2003 | Li et al. |
| 2003/0098879 A1 | 5/2003 | Matthews |
| 2004/0015848 A1 * | 1/2004 | Bystedt et al. .............. 717/116 |
| 2004/0194063 A1 * | 9/2004 | Pereira ....................... 717/124 |
| 2004/0260980 A1 * | 12/2004 | Ito et al. ....................... 714/38 |
| 2005/0114738 A1 * | 5/2005 | Ma et al. ...................... 714/38 |
| 2006/0123022 A1 * | 6/2006 | Bird ........................... 707/100 |
| 2006/0190770 A1 * | 8/2006 | Harding ....................... 714/38 |
| 2007/0067754 A1 * | 3/2007 | Chen et al. .................. 717/127 |
| 2008/0059841 A1 * | 3/2008 | Bordawekar et al. .......... 714/38 |

OTHER PUBLICATIONS

Jaeger, T. et al., "Synchronous IPC over Transparent Monitors", donwloaded Oct. 31, 2005.
Sankak, S. et al., "Specifying and Testing Software Components Using ADL", Sun Microsystems Laboratories, Inc., Mountain View, CA, Apr. 1994.
Enfocus, http://www.enfocus.com/products/overview.php?nr=3, downloaded Oct. 31, 2005.
IBM Rational, http://www-306.ibm.com/software/rational/, downloaded Oct. 31, 2005.

* cited by examiner

*Primary Examiner*—Marc Duncan (57) ABSTRACT

A data object of a data file that causes an error in an application is identified. In a method for identifying the data object, the data file is processed with the application and the interactions between the application and an operating system are intercepted. The intercepted interactions are correlated with the error and the data object of the data file is correlated with at least one of the intercepted interactions to identify the data object that causes the error.

25 Claims, 6 Drawing Sheets

IDENTIFYING AN OBJECT IN A DATA FILE THAT CAUSES AN ERROR IN AN APPLICATION

BACKGROUND

A large number of applications created by third party vendors are typically used in processing data files. These applications are provided to users "as is" and usually do not include source code. In other words, these applications typically are not open source applications. In these types of applications, if an error occurs during processing of a data file, a user generally cannot determine which object in a data file caused the error in the application because the source code is not available for debugging the application. To correct the error, the user typically takes a trail and error approach by editing the data file and by trying to process the data file until the application runs without failure. This approach, however, is often very time consuming and difficult.

In large print jobs, for instance, a raster image processor may process a large image file and eventually fail after several hours of processing. As such, considerable time and resources may be lost in taking the trail and error approach to debugging data files. Therefore, it would be beneficial to identify the data objects of a data file that cause errors in an application via a systematic approach in order to produce data files that do not cause the application to fail.

SUMMARY

A method for identifying a data object of a data file that causes an error in an application is disclosed herein. In the method, the data file is processed with the application and the interactions between the application and an operating system are intercepted. At least one of the interactions is correlated with the application processing error. In addition, the data object of the data file is correlated with the at least one of the interactions to identify the data object that causes the error.

BRIEF DESCRIPTION OF THE DRAWINGS

Embodiments of the invention are illustrated by way of example and without limitation in the accompanying figures in which like numeral references refer to like elements, and wherein.

DETAILED DESCRIPTION

For simplicity and illustrative purposes, various embodiments of the present invention are shown by way of examples of systems and methods as described herein. In the following description, numerous specific details are set forth in order to provide a thorough understanding of the various embodiments. It will be apparent however, to one of ordinary skill in the art, that the various embodiments may be practiced without limitation to these specific details. In other instances, well known methods and structures have not been described in detail so as not to unnecessarily obscure the various embodiments.

A system and method for identifying a data object in a data file that causes an error in an application is described herein. Generally speaking, the system tracks calls made between the application and an operating system during processing of the data file containing multiple data objects. When an error is detected, the system identifies which of the data objects was processed most recently prior to the time when the error was detected. That data object may be considered as the data object that caused the error. In addition, the identification of that data object may be reported to a user in graphical form. Moreover, the user may be provided with a substantially global view of the data file processing up to the point when the application encounters the failure.

Figure 1:
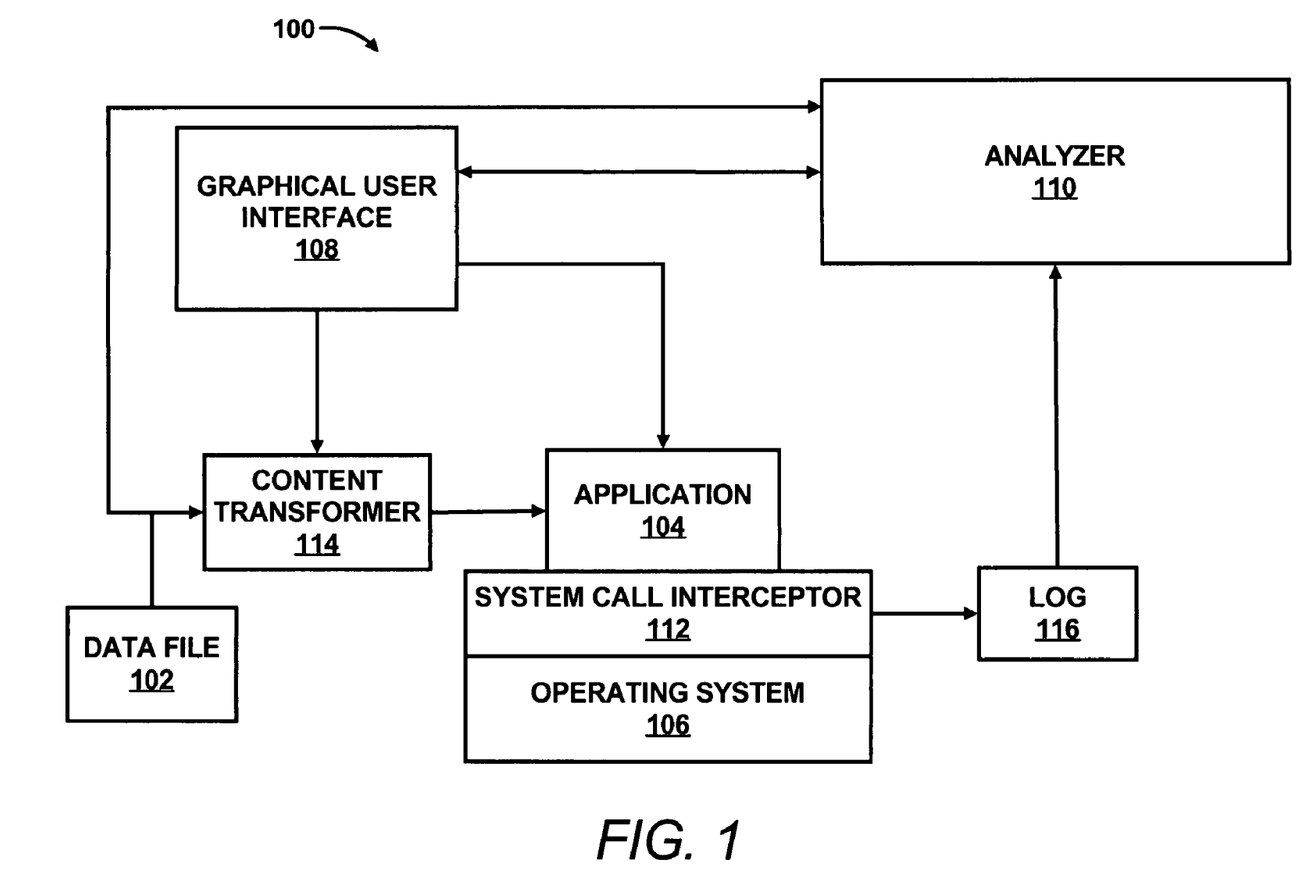
FIG. 1 shows a block diagram of a system for identifying a data object in a data file that causes an error in an application, in accordance with an embodiment of the invention.

With reference first to FIG. 1, there is shown a block diagram of a system 100 for identifying a data object in a data file 102 that causes an error in an application 104 running on an operating system 106. It should be understood that the following description of the system 100 is but one manner of a variety of different manners in which such a system 100 may be configured. In addition, it should be understood that the system 100 may include additional components and that some of the components described may be removed and/or modified without departing from a scope of the system 100.

As shown, the system 100 includes a graphical user interface 108, an analyzer 110, a system call interceptor 112, and a content transformer 114. Generally speaking, the system call interceptor 112 may produce a log 116 of system calls used by the analyzer 110 to identify the data object in the data file 102 that caused an error in the application 104.

The data file 102 is put into the system 100 and is processed by the application 104. In processing the data file 102, the application 104 makes calls to the operating system 106. These calls are tracked or intercepted by the system call interceptor 112 and may be used to produce the log 116. The log 116 may also include runtime information and read location information associated with the calls.

The location information may be explicitly encoded into an object location segment of the data file to make the data objects accessible by the application 104. One scheme to encode the location information of the data object is to record the staring position of the data object relative to the beginning of the data file. The object location segment may comprise a table to describe the one-to-one mapping between a data object and its object location. The table may be referred to as the object location table, which may be stored as part of the data file. The object locations may also be determined through processing of the data file prior to processing by the application 104. Another manner in which the object locations may be determined is to interpret the file access information to dynamically build the location table as the data file is processed by the application 104.

The application 104 may operate according to the following sequence to perform the read operation (that is, to retrieve the data object in a random access memory). First, the application 104 may determine the starting position of the data object by consulting the object location table in the data file. The application 104 may then make an operating system call to configure the read operation, such that the next read operation started is at the location specified by the data object. Third, the application 104 may issue the read system call to fetch the data object into the application 104. In the third step, if the data object is too large to be fetched in one read operation, for instance, due to the limited buffer size designated to the read operation, then at least the first portion of the data object may be fetched into the application 104. Depending on the actual implementation of the operating system, the second and third steps may be aggregated into one read-related system call.

The analyzer 110 may access the log 116 to determine which data object in the data file 102 caused an error in the application 104. More particularly, for instance, upon the occurrence of an error in the application 104, the analyzer 110 may load the log 116 and may analyze the information contained in the log 116, as described in greater detail herein below. The analyzer 110 may also use the runtime information available from the intercepted system calls and static data object information to identify which data object in the data file 102 caused the error in the application 104. More particularly, the analyzer 110 may use static data object information from one or both of an object dependency tree 200 (shown in FIG. 2) and an object location table (not shown) of the static data object information. The object dependency tree 200 generally depicts an example of the hierarchical arrangement of data objects and sub-objects.

In an example, the analyzer 110 may use the read location information from the calls to determine which data object within the object location table is being processed by the application 104 when the error occurs. The analyzer 110 may identify the data object by matching the read location information and object location information from the object location table, as described in greater detail herein below. The analyzer 110 may also send information pertaining to the identified data object to the graphical user interface 108, which may be employed to display this information to a user.

In other words, a determination of the read location information associated with the read operation configuration and the read operation at a particular time instance may be accomplished by intercepting the read operation configuration of the operating system and the actual read operation described above, and by recording the time stamp at the moment that the read operation under the read operation configuration occurs. With such read location information, the object location table may be consulted to determine which data object is under processing at that instance in time. As a result, by capturing the interactions between the application 104 and the operating system 106 via interception of operating system calls, and by combining the intercepted system call information and the statically declared object location table in the data file, the data object being processed in the application 104 may be traced.

In certain instances, the same data object may appear more than once in the object dependency tree, for instance, if the same data object is referenced by other objects, following the "is referenced by" relationship that indicates that one data object is referenced by the other data object in a data file. In this case, the analyzer 110 may backward traverse the log 116 to determine which data object is the actual source of the error. The analyzer 110 may make this determination by determining whether the data object makes a reference to the previously identified data object during a processing operation of the data object. In this situation, both the previously identified data object (the data object that is being referenced) and the data object (the data object that is the owner of the reference) may be presented to the user through the graphical user interface 108.

In addition to the "is referenced by" relationship, other examples of data object dependencies may include, the "is composed of" relationship, where one data object is a composite data object that contains some other data objects, or the "is followed by" relationship, where one data object is followed by the other data object in some ordering scheme and both data objects are contained by the same higher level data object. The various relationships disclosed above comprise a relatively small number of notations used in object-oriented program analysis.

Depending on the buffer-size chosen by the operating system, in certain instances, a data object may be too large to be fetched in one read operation. In that case, the application 104 processes the fetched data portion, and issues a second read operation to fetch the subsequent data portion of the data object. If the application 104 fails in the processing of the second data portion, this is an indication that the read location information of the second read operation does not match any object location stored in the object location table. To accommodate such circumstances, the size of the data object is recorded into the object dependency tree during a structural analysis of the data file 102. If the read location information is determined to be within a location range between the first location, which is the object location of the current data object, and the second location, which is the object location of the current data object plus the object size of the current data object, the read operation may be determined as being associated with the current data object.

In other instances, a single read operation may actually fetch two data objects if the two data objects are located relatively too close to each other. In addition, the application 104 may have its implementation optimized in such a way that processing of the second data object will be conducted in the data buffer inside the application 104, instead of issuing a new read operation for the second object. In such circumstances, if the application 104 fails, instead of having a single object identified as the cause of the error, a collection of data objects may be identified as the cause of the error. In addition, the data objects in the collection of data objects may be identified as those data objects that are located relatively closely to the first data object as revealed by their read operations via the system call interceptor 112. To accommodate such circumstances, the content transformer 114 may be invoked to position individual data objects in the collection into new file locations, such that their location are sufficiently separated to ensure that the read operations of each data object may be revealed by the system call interceptor 112.

In addition, the content transformation is performed such that the semantics of the data file 102 are not modified. Correspondingly, following the content transformation, the data file 102 may have an updated object location table. Thus, future runs of the application 104 will then be able to identify a single data object as the cause of the error.

Once a data object from the existing data file 102 is determined, the user may further employ the graphical user interface 108 to drill down into the data objects of the data file 102, if the identified data object is partitionable into a plurality of sub-objects. The identified data object may be partitioned in order to more precisely determine the error cause. The data object and the resulting sub-objects form the "is composed of" relationship. The user may employ the graphical user interface 108 in this manner as such sub-objects may not appear in the object location table, and may therefore not be explicitly accessible by the application 104. In this case, the graphic user interface 108 may interact with both the application 104 and the content transformer 114.

More particularly, instructions may be transmitted or otherwise sent through the graphical user interface 108 to the content transformer 114 to separate the data objects into a plurality of respective sub-objects. In response, the content transformer 114 may separate the data objects into the respective sub-objects and may transmit or otherwise send the entire transformed data file or just the sub-objects to the application 104 for processing. In addition, the content transformer 114 may perform the data object transformation such that the process does not modify the semantics of the data object.

Furthermore, the content transformer 114 may position these sub-objects into different file locations in the data file, based upon, for instance, the buffer size of the read operation. In one regard, sub-objects may be positioned such that each fetching of the sub-objects into the application 104 may reveal its read operation configuration and read operation to the system call interceptor 112, such that each sub-object may be explicitly tracked while being processed by the application 104. The object location table may then be updated to reflect the introductions of these explicitly accessible sub-objects. The object dependency tree may correspondingly be updated by attaching these newly introduced sub-objects into the object dependency tree.

As described above, the application 104 makes calls to the operating system 106 in processing the data file 102. The system call interceptor 112 tracks or intercepts these calls and produces the log 116 based upon these calls. Upon the occurrence of an error in the application 104, the analyzer 110 may load the log 116 and may analyze the information contained in the log 116. The analyzer 110 may also use the runtime information captured from the calls and the updated object location table to determine which newly introduced sub-object in the data file 102 caused the error in the application 104.

In determining the cause of the error, the analyzer 110 may compare the read location information from the call with the updated object location, including the sub-objects, in the object location table. More particularly, for instance, the analyzer 110 may determine which of the sub-objects is being processed by the application 104 at the time the system call is being made at the operating system 106, in response to the request from the application 104. The analyzer 110 may also send this information to the graphical user interface 108, which may be employed to display this information to the user, along with the updated object dependency tree to show the position of the identified sub-object in the object dependency tree with respect to the other data objects. This process may continue until an object or sub-object which cannot be subdivided is reached, or the user considers that the data object granularity is sufficient to determine the root cause of the error.

Figure 2:
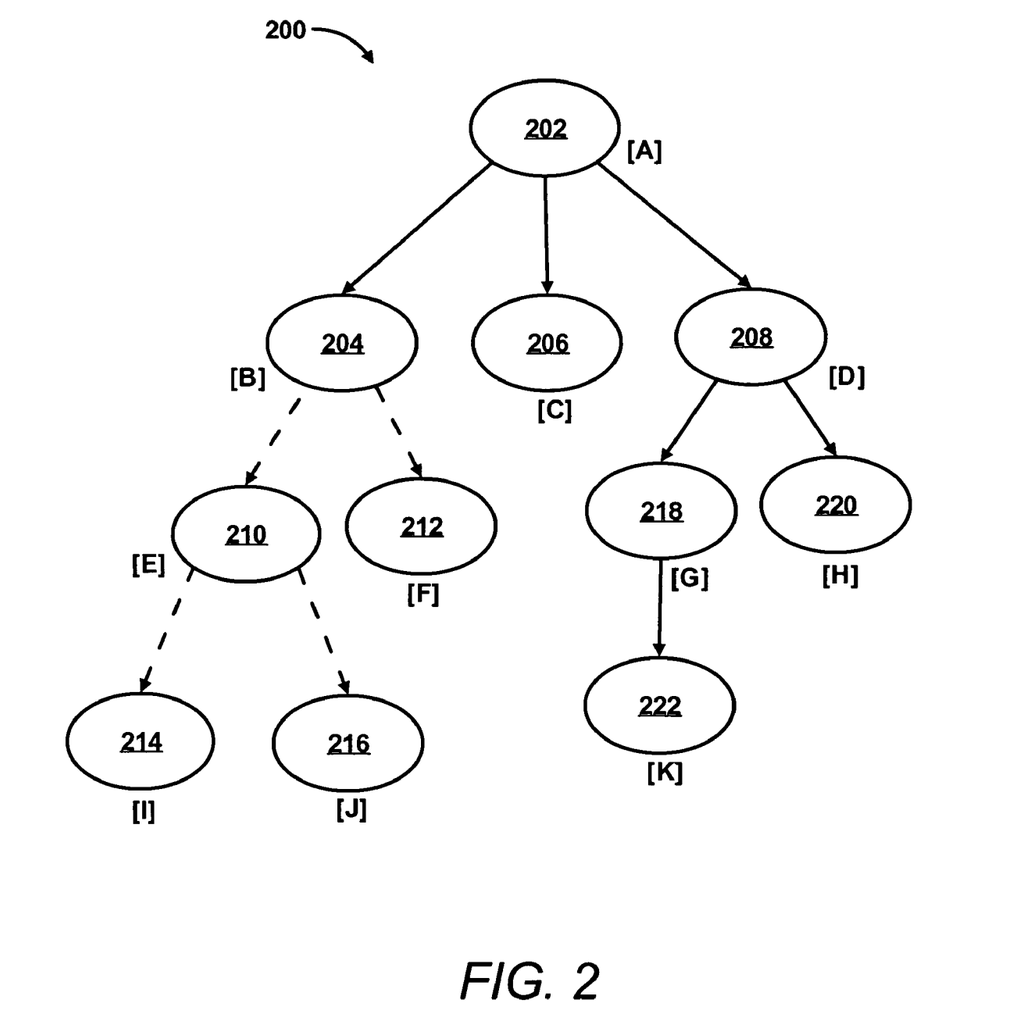
FIG. 2 shows a diagram of a graphical user interface in accordance with an embodiment of the invention.

The use of the graphical user interface 108 to determine which object or sub-object caused the error is described in greater detail with respect to FIG. 2. More particularly, FIG. 2 depicts a diagram of an object dependency tree 200 of the graphical user interface 108 described above in FIG. 1 associated with the data file 102. The object dependency tree 200 generally depicts an example of the hierarchical arrangement of data objects and sub-objects.

In FIG. 2, the data object 202 generally represents the data file 102 and includes sub-objects 204, 206, and 208. In addition, the sub-object 204 is depicted as including sub-objects 210 and 212, and the sub-objects 210 is further depicted as including sub-objects 214 and 216, while the sub-object 212 is depicted as having no further sub-objects. The sub-object 206 may be fundamental and is thus illustrated as also having no sub-objects. The sub-object 208 is illustrated as having sub-objects 218 and 220, and the sub-object 218 is depicted as further including sub-object 222. Sub-objects and sub-trees may also be referenced multiple times by different objects within the tree. This is represented as multiple instances appearing within the tree, so that the exact object process path may be determined for the precise failure instance.

Each of the objects 202-222 may also include a label (shown as A-K) to represent the object location for the objects 202-222. Furthermore, a time stamp for indicating a point in time at which each object 202-222 was processed by the application 104 may also be annotated to the tree based on the time stamp associated with the intercepted system calls.

If it is determined that the sub-object 204 caused an error in the application 104, the sub-object 204 may be highlighted or otherwise distinguished for the user. The user, from viewing the graphical user interface 108, may determine that the sub-object 204 is eligible for partitioning and may select the sub-object 204, such as, by "clicking" on the sub-object 204. At this point, the graphical user interface 108 may interact with the content transformer 114 and the application 104 as described in the description of FIG. 1 above and the transformed results may be displayed for the user. For instance, the graphical user interface 108 may identify the sub-object 204 as causing the error. The user may select the sub-object 204 in the graphical user interface 108 and the graphical user interface 108 may then command content transformer 114 to transform the sub-object 204.

The content transformer 114 may transform the sub-object 204 by separating the sub-object 204 into the sub-objects 210, 212. The object dependency tree and object location table may also be updated so that those sub-objects 210, 212 may be identified by the graphical user interface 108 during future processing operations. This process may continue until the most basic sub-object 214, 216 of the data object 204 that caused the error, for instance, the sub-object 216 in the application is identified. In this case, the process may end following performance of the second round of object partitioning to partition the sub-object 210 into the sub-objects of 214 and 216. The dashed lines shown in FIG. 2 indicate that the sub-objects 210-216 are created based on the user's command, instead of being available in the original data file.

Figure 3:
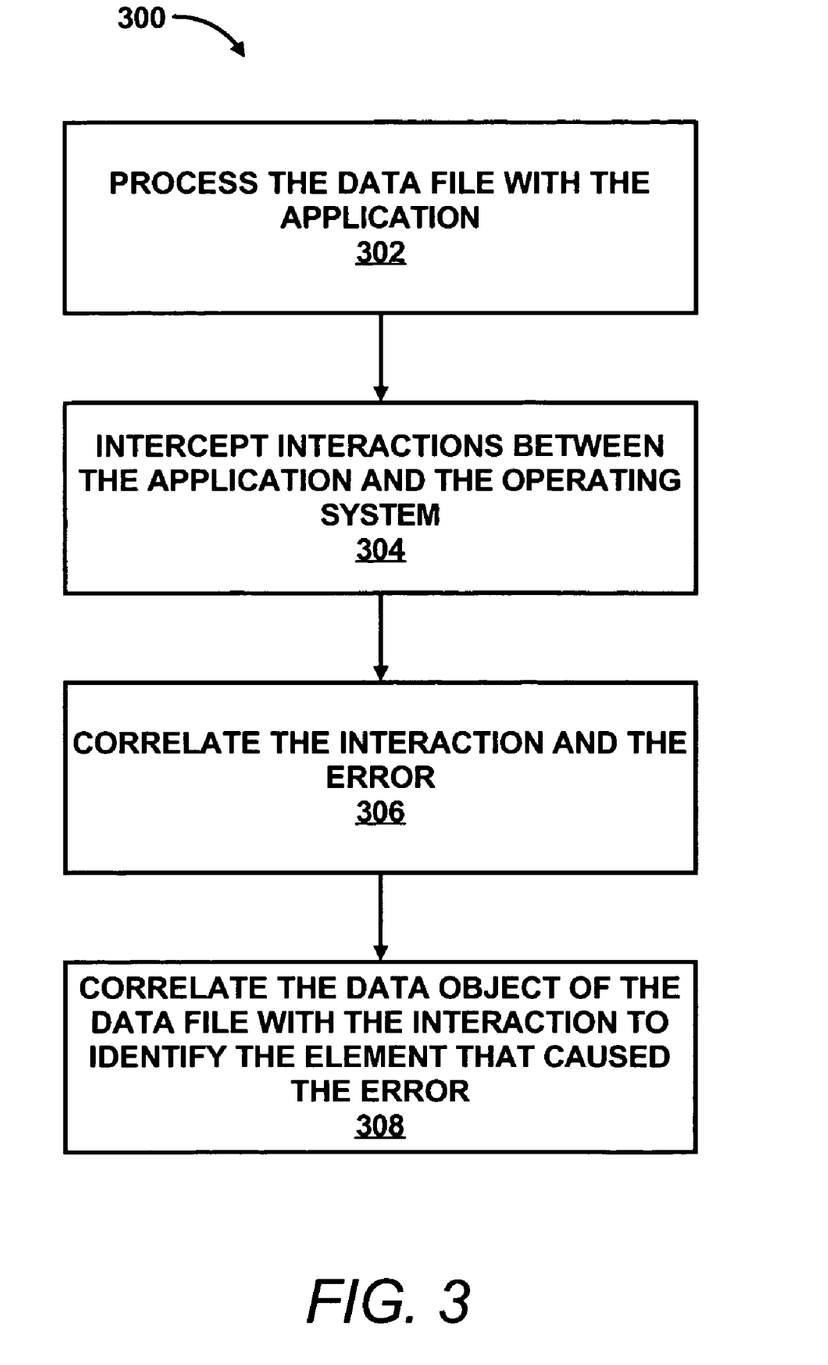
FIG. 3 shows a flow diagram of a method for identifying a data object of a data file that causes an error in an application, in accordance with an embodiment of the invention.

FIG. 3 shows a flow diagram of a method 300 for identifying a data object of a data file 102 that causes an error in an application 104. The following description of the method 300 is made with reference to the system 100 illustrated in FIG. 1, and thus makes reference to the elements cited therein. It should, however, be understood that the method 300 shown in FIG. 3 is not limited to being implemented by the elements shown in FIG. 1 and may be implemented by more, less, or different elements as those shown in FIG. 1. In addition, it should also be understood that the following description of the method 300 is one manner of a variety of different manners in which the system 100 may be implemented.

In the method 300, the application 104 processes the data file 102 at step 302. The system call interceptor 112 intercepts interactions between the application 104 and the operating system 106 at step 304. More particularly, for instance, the system call interceptor 112 intercepts calls made between the application 104 and the operating system 106. In addition, during processing of the data file 102, an error may be detected.

The analyzer 110 correlates at least one of the interactions between the application 104 and the operating system 106 with the error at step 306. The analyzer 110 also correlates the data object of the data file 102 with the at least one of the interactions between the application 104 and the operating system 106, such that the data object that caused the error is identified at step 308.

Figure 4:
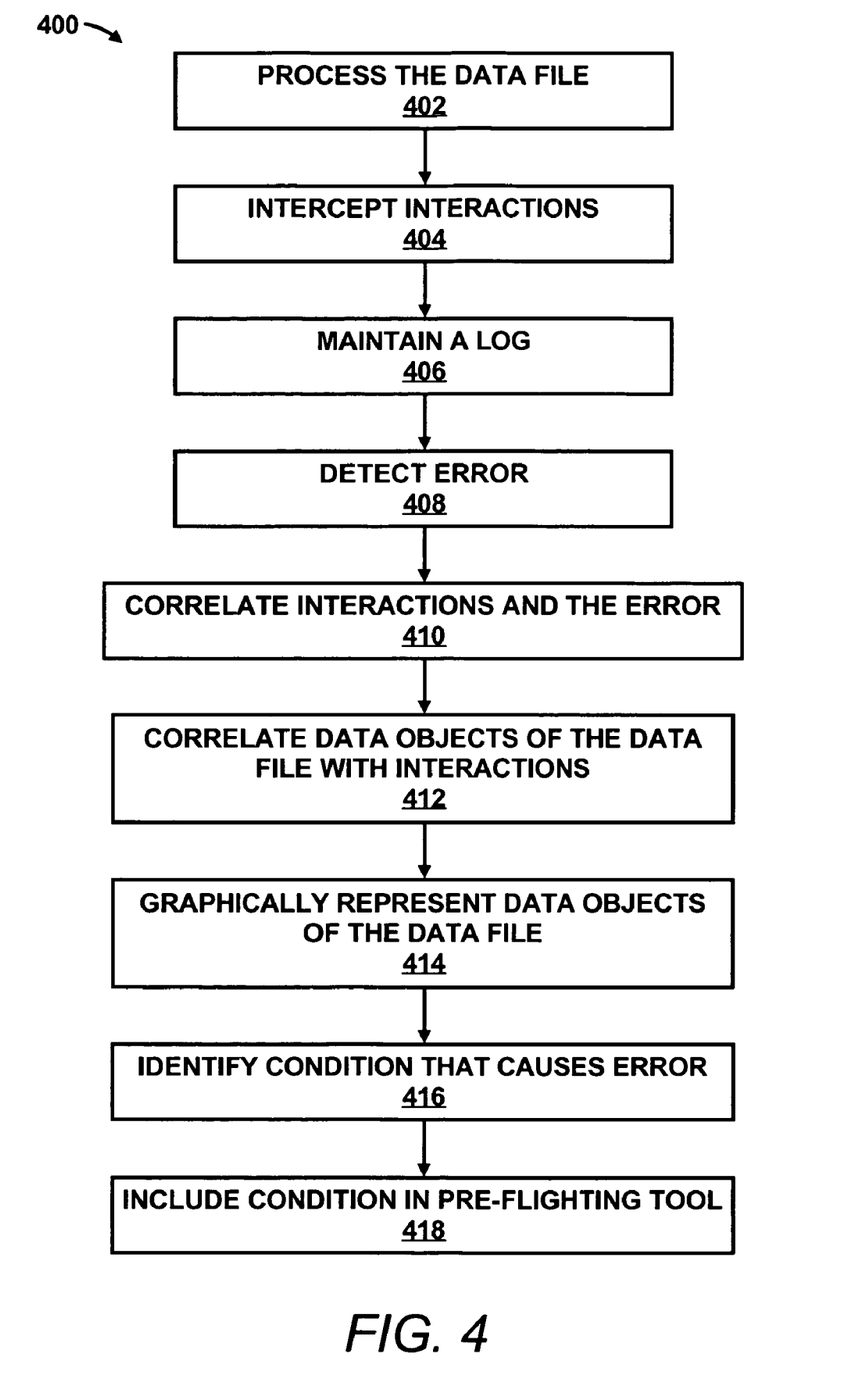
FIG. 4 shows a flow diagram of a method for identifying a data object of a data file that causes an error in an application, in accordance with another embodiment of the invention.

A more detailed description of the steps outlined in the method 300 is provided below with respect to the method 400. More particularly, FIG. 4 shows a flow diagram of a method 400 for identifying a data object of a data file 102 that causes an error in an application 104. The following description of the method 400 is made with reference to the system 100 illustrated in FIG. 1, and thus makes reference to the elements cited therein. It should, however, be understood that the method 400 shown in FIG. 4 is not limited to being implemented by the elements shown in FIG. 1 and may be implemented by more, less, or different elements as those shown in FIG. 1. In addition, it should also be understood that the following description of the method 400 is one manner of a variety of different manners in which the system 100 may be implemented.

In the method 400, the application 104 processes the data file 102 at step 402. In processing the data file 102, the application 104 interacts with the operating system 106. At step 404, the system call interceptor 112 intercepts the interactions between the application 104 and the operating system 106. More particularly, for instance, the system call interceptor 112 intercepts calls sent from the application 104 to the operating system 106 regarding read operation configurations and read operations, in processing the data file 102. The system call interceptor 112 also maintains a record of the interactions in a log 116 at step 406. The log 116 may also include information pertaining to the call parameters associated with the system calls and time stamps of the times at which the system calls occur.

One of the call parameters is the read location information. The read location information generally indicates which data object within the object location table is being processed by the application 104 at a given time. The read location information may be correlated to, for instance, object location information that is stored in an object location table. In addition, an object dependency tree, such as the object dependency tree 200 depicted in FIG. 2 may be constructed through a structural analysis of the data file 102.

At step 408, an error from the application 104 may be detected. In addition, at step 410, the analyzer 110 may read the log 116 and correlate the interactions between the application 104 and the operating system 106 with the error. The analyzer 110 also correlates the data object of the data file 102 with the interaction such that the data object that causes the error is identified at step 412. These correlations may be accomplished by retrieving from the log information regreading the most recently issued read operation by the application 104. This information may be used to compare the data object location that corresponds to a particular data object with the location information captured from the most recently read interaction between the application 104 and the operating system 106. More particularly, for instance, the analyzer 110 may identify the data object, if the read location information is identical to the location information of the data object recorded in the object location table, or the read location falls between the first location, which is the object location of the data object and the second location, which is the object location of the data object plus the object size of the data object. In addition, the identified data object may be reported as the data object that caused the error.

At step 414, the graphical user interface 108 may display the data object of the data file 102 in a graphical representation such as an object dependency tree. The data object that is identified to cause the error may be highlighted in the object dependency tree. The object dependency tree may also include an annotation regarding the data object location, and, in certain instances, the time that the data object starts to be processed, as described herein above with respect to FIG. 2. The processing start time may be inferred from the corresponding read operation captured by the system call interceptor 112. The processing start time information may also be used to separately produce a time line displaying the time each data object was processed at step 412, in order to enable a visualization of how much time variation occurred in processing different data objects in the data file 102.

A user may view the graphical user interface 108 and the data file 102 to identify a condition that caused the error in the application 104 at step 416. The data object being processed at the time the error occurs may be considered as the data object in the data file 102 that caused the error because that data object has the highest likelihood of having caused the error. In instances where the identified data object contains a plurality of data objects or sub-objects, which may be relatively more significant as the root cause of the error, the data object may be transformed by being separated into a plurality of sub-objects by the content transformer 114. In addition, the sub-object that caused the error may be identified through operation of steps 402-416.

As shown at step 418, the condition that caused the error may optionally be included as a rule in a pre-processing tool, such as, a pre-flighting tool, which may be contained in or operated in conjunction with the application 104. The inclusion of the condition in the pre-processing tool, for instance, allows the condition to be recognized before other similar data files are processed by the application 104, and therefore to substantially present the same data processing error to occur in future runs of the application.

Figure 5:
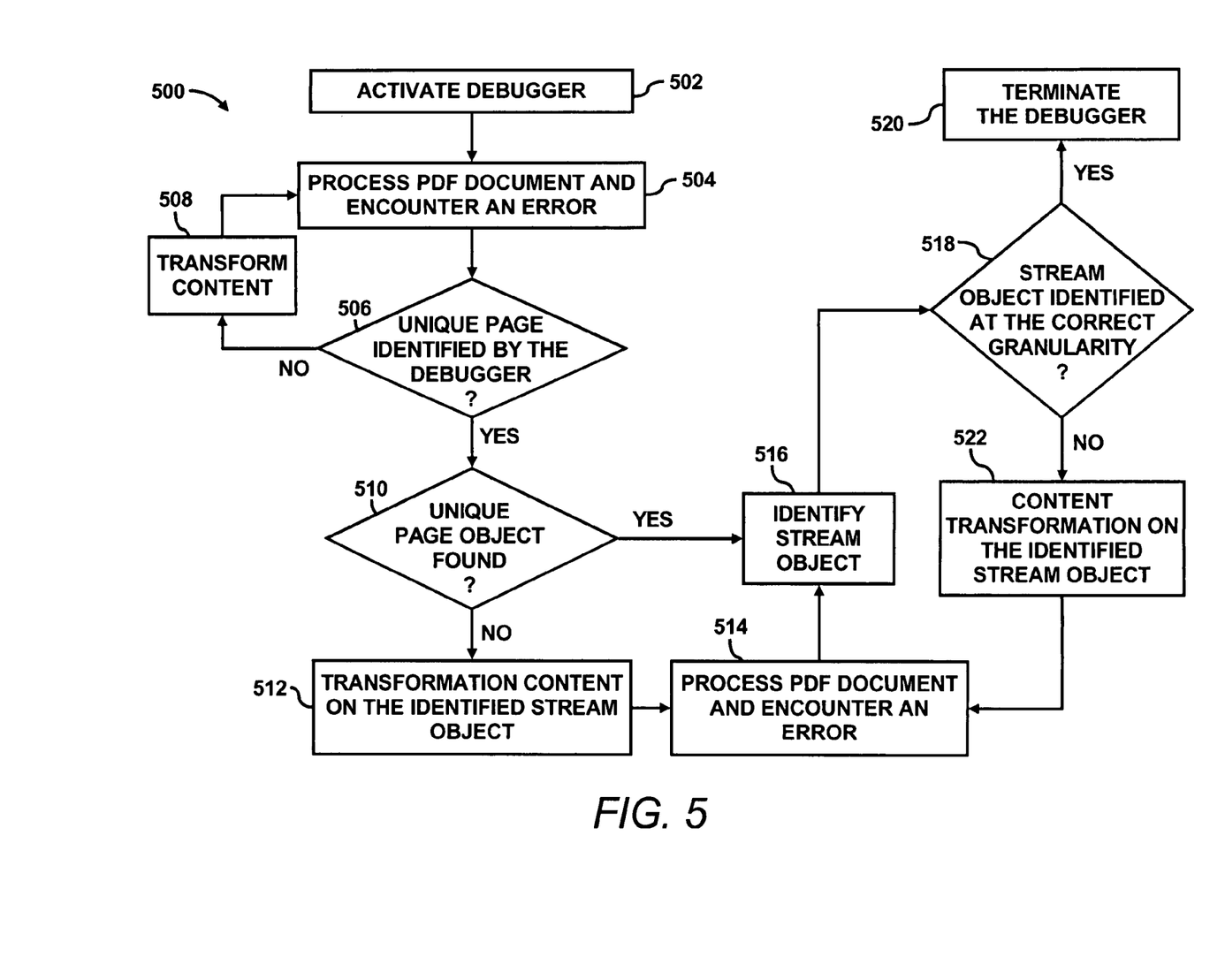
FIG. 5 shows a flow diagram of a method for identifying a data object of a data file that causes an error in an application, in accordance with another embodiment of the invention.

FIG. 5 shows a flow diagram of a method 500 for identifying a data object of a data file 102 that causes an error in an application 104. The following description of the method 500 is made with reference to the system 100 illustrated in FIG. 1, and thus makes reference to the elements cited herein. It should, however, be understood that the method 500 shown in FIG. 5 is not limited to being implemented by the elements shown in FIG. 1 and may be implemented by more, less, or different elements as those shown in FIG. 1. In addition, it should also be understood that the following description of the method 500 is one manner of a variety of different manners in which the system 100 may be implemented.

In the method 500 shown in FIG. 5, the data file 102 is a portable document format (PDF) file including graphical information, and the application 104 is a publishing system application. The application 104 may also include a raster image processor on PDF files or a pre-processing tool for error checking on PDF files. In general, a PDF file describes one or more PDF pages having PDF page objects. Each PDF page object is composed of a PDF resources object and a PDF contents object. A PDF resources object may make references to the specific PDF resource objects, such as Fonts and Images. Each PDF contents object further contains one or more stream objects, which describes a sequence of instructions for rendering graphical objects at each page. The stream objects are described as being arranged in a binary stream and each stream object may be partitioned into multiple sub-stream objects, each of which is a PDF content stream object and controls the rendering of a portion of graphical content on a PDF page.

At step 502, a debugger, such as the system 100 depicted in FIG. 1, is activated. As shown, the application 104 (raster image processor) processes the data file 102 (PDF file) and encounters an error at step 504. At step 506, the analyzer 110 determines if a unique PDF page of the PDF file is identified by the debugger. A unique PDF page may not be identified, for instance, when the stream objects that instruct graphical object rendering onto two consecutive PDF pages are all fetched into the application 104 by a single read operation issued to the operating system 106.

In this case, the PDF file is sent to the content transformer 114 that transforms the content such that the stream objects of the involved PDF pages are separated into different locations, as indicated at step 508. In addition, at step 508, the stream objects are transformed without modifying the semantics of the stream objects and the PDF file, such that fetching of each stream object goes through a separate read operation issued by the application 104 to the operating system 106. The modified PDF file is sent to the raster image processor of the application 104 and operations flow again from step 504. This process continues until a unique PDF page is identified at step 506. Whether a read operation fetches more than one PDF page or not may be determined by the actual implementation of the data interpreter, the read location information, the number of bytes the read operation actually fulfills, and the distribution of object location associated with the stream objects in different pages.

When a unique PDF page is identified, the analyzer 110 determines if a unique PDF stream object is identified, as indicated at step 510. If a unique PDF stream object in the uniquely identified page is not identified, the PDF file is again sent to the content transformer 114. A unique PDF stream object may not be identified because the stream objects that are within a faulty page are all fetched into the application 104 through the same read operation. In this instance, at step 512, the multiple stream objects are transformed to be arranged into different file locations, such that fetching of each stream object will be revealed by the interception of the system calls. The PDF file is then processed by the raster image processor of the application 104 and encounters an error at step 514.

Following step 514 or if a unique PDF stream object has been identified at step 510, a stream object is identified at step 516. If a stream object is not identified at step 510, a stream object may eventually be identified through steps 512 and 514. In addition, the analyzer 110 may determine whether the stream object is identified at the correct granularity at step 518. The correct granularity may include, for instance, a line, a paragraph, a header, an image, etc., that caused the error. In addition, the user may use a static error checking tool, such as, a font checker, an image checker, an existing pre-flight tool, etc., with a focus on the identified stream object. In one respect, the user may implement a report created by the error checking tool to better understand the cause of the error. In addition, although such a static checking tool might report a relatively large number of potential errors over an entire data file, the confidence level in having detected the cause of the error may significantly be improved because the user has already identified a sufficiently small error region. As such, a final determination of the cause of the error may be identified through implementation of the method 500 and a static checking tool.

If the stream object is identified at the correct granularity, the debugger terminates as indicated at step 520. If the stream object is not identified at the correct granularity, the user may interact with the graphical user interface 108 to drill down into the stream object in order to identify the sub-stream objects that causes the error in the raster image processor of the application 104, as indicated at step 522. At this point, control returns to step 514 where the PDF file is processed and the error is again encountered. In addition, steps 514, 516, 518, and 522 may be repeated for a number of times until it is determined that the stream object is identified at the correct granularity and the debugger may be terminated as indicated at step 520.

Some of the steps illustrated in the methods 300, 400, and 500 may be contained as a utility, program, subprogram, in any desired computer accessible medium. In addition, the methods 300, 400, and 500 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices.

Examples of suitable computer readable storage devices include conventional computer systems RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 6:
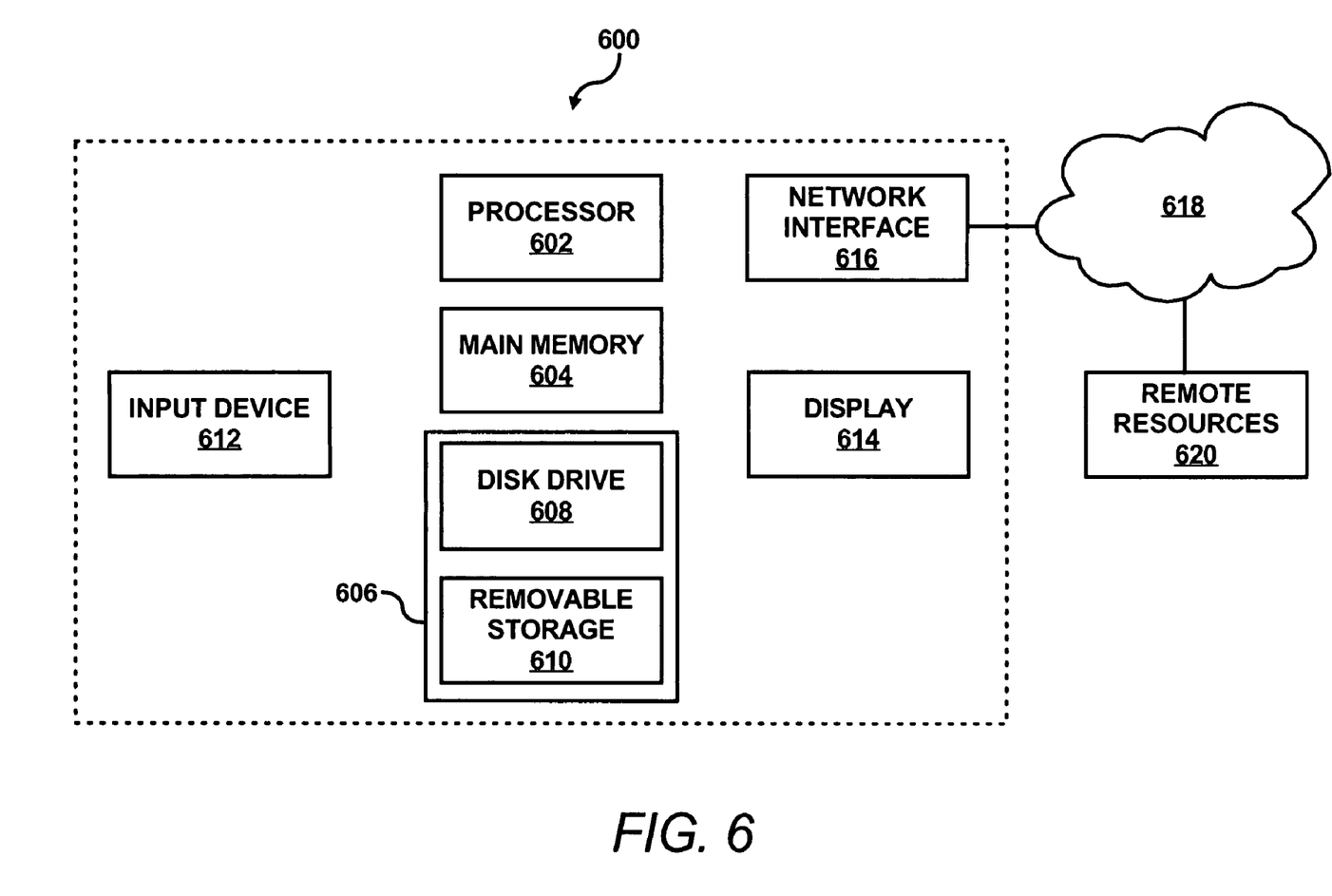
FIG. 6 shows a schematic diagram of a computer system, which may be employed to perform the various functions of the identification system, according to an embodiment of the invention.

FIG. 6 illustrates a block diagram of a computer system 600 that may implement some or all of the steps identified in the methods 300, 400, 500 shown in FIGS. 3-5. The computer system 600 includes one or more processors, such as processor 602, providing an execution platform for execution software. The processor 602 may also execute an operation system (not shown) for executing the software in addition to performing operation system tasks.

The computer system 600 also includes a main memory 604, such as a Random Access Memory (RAM), providing storage for executing software during runtime and mass storage 606. The mass storage 606 may include a hard disk drive 608 and/or a removable storage drive 610, representing a floppy diskette drive, a magnetic tape drive, a compact disk drive, or a nonvolatile memory where a copy of software or data may be stored. Applications and resources may be stored in the mass memory 606 and transferred to the main memory 604 during run time. The mass memory 606 may also include ROM (read only memory), EPROM (erasable, programmable ROM), EEPROM (electronically erasable, programmable ROM).

A user interfaces with the computer system 600 with one or more input devices 612, such as a keyboard, a mouse, a stylus, or any other input device and views results through a display 614. A network interface 616 is provided for communicating through a network 618 with remote resources 620. The remote resource 620 may include servers, remote storage devices, data warehouses, or any other remote device capable of interacting with the computer system 600.

What has been described and illustrated herein are examples of the systems and methods described herein along with some of their variations. The terms, descriptions and figures used herein are set forth by way of illustration only and are not meant as limitations. Those skilled in the art will recognize that may variations are possible within the spirit and scope of these examples, which intended to be defined by the following claims and their equivalents in which all terms are meant in their broadest reasonable sense unless otherwise indicated.

What is claimed is:

1. A method for identifying a data object of a data file that causes an error in an application, the method comprising:
   processing the data file with the application;
   intercepting interactions between the application and an operating system;
   correlating at least one of the interactions and the error; and
   correlating the data object of the data file with the at least one of the interactions to identify the data object that causes the error.

2. The method of claim 1, wherein the step of intercepting interactions between the application and the operating system further comprises intercepting calls made between the application and the operating system, wherein the calls include associated read location information.

3. The method of claim 2, wherein the step of correlating the at least one of the interactions and the error further comprises:
   identifying the read location information from a most recent read related interaction prior to occurrence of the error.

4. The method of claim 3, wherein the data object includes object location information, and wherein the step of correlating the data object of the data file with the at least one of the interactions further comprises:
   identifying the data object whose object location information is at least one of identical to the read location information based upon the identified read location information and determinable from the read location information; and
   indicating that the identified data object is the data object that caused the error.

5. The method of claim 1, further comprising:
   identifying a condition that caused the error; and
   including a rule in a preflighting tool to substantially prevent the condition from being triggered in another data file processing operation.

6. The method of claim 1, wherein the data file includes a plurality of data objects, and wherein the step of correlating the data object of the data file with at least one of the interactions further comprises:
   transforming the data file such that the plurality of data objects are processed by the application and that the processing of each of the plurality of data objects is captured during the step of intercepting interactions between the application and the operating system.

7. The method of claim 6, wherein the step of transforming the data file further comprises separating a data object of the data file into a plurality of sub-objects that depend upon the data object and wherein the step of correlating the data object of the data file with the at least one of the interactions further comprises correlating the sub-object with the at least one of the intercepted interactions to identify the sub-object that causes the error.

8. The method of claim 6, wherein the plurality of data objects comprises a stream object, and wherein the step of transforming the data file further comprises:
   splitting the stream object into multiple stream objects;
   positioning the multiple stream object into different locations in the data file such that each stream object includes related interactions with the operating system.

9. The method of claim 8, further comprising:
   intercepting the related interactions between the multiple stream objects and the operating system; and
   updating an object location table in the data file with the intercepted related interactions.

10. The method of claim 9, further comprising:
    determining whether a unique page object has been identified;
    transforming the multiple stream objects to be arranged into different file locations, such that the fetching of each of the multiple stream objects is revealed by the interception of the system calls, in response to a unique page object not being identified;
    processing the multiple stream objects;
    encountering an error; and
    identifying a unique stream object based upon the error encountered.

11. The method of claim 10, further comprising:
    determining whether the stream object has been identified at the correct granularity; and
    drilling down into the stream object to identify one or more sub-stream objects that causes the error in response to the identified stream object being at too coarse of a granularity.

12. The method of claim 1, further comprising:
    constructing an object dependency tree through a structural analysis of the data file; and
    maintaining a log representing the intercepted interactions between the application and the operating system, said log including call parameters associated with the system calls, and time stamps depicting when the system calls occur.

13. The method of claim 12, further comprising:
    graphically representing the object dependency tree to reveal the structural relationship of a plurality of data objects in the data file.

14. The method of claim 13, further comprising:
    graphically annotating object location information to the plurality of data objects and the times at which the plurality of data objects are processed.

15. A system for identifying a data object in a data file that causes an error in an application running on an operating system, the system comprising:
    an interceptor composed of code stored on a tangible computer-readable storage medium configured to track calls between the application and the operating system; and
    an analyzer composed of code stored on a computer-readable storage medium configured to identify an occurrence of the error and to correlate the occurrence of the error with the data object to identify the data object that causes an error in the application.

16. The system of claim 15, wherein the application is configured to fetch the data object from the data file and to process the data object, and wherein the application is further configured to make calls in the operating system during processing of the data object.

17. The system of claim 15, wherein the data file includes a plurality of data objects, the system further comprising:
    a graphical user interface configured to display the data file such that the plurality of data objects are arranged in a hierarchical tree and wherein the graphical user interface is configured to display the object location of each of the plurality of data objects in the file, and the time at which each of the plurality of data objects of the data file is processed.

18. The system of claim 15, wherein the data file includes graphical information and the application comprises a publishing system application.

19. The system of claim 18, wherein the publishing system application comprises at least one of a raster image processor and a preflighting tool.

20. The system of claim 15, further comprising:

a content transformer composed of code stored on a computer-readable storage medium for splitting a stream object from the data file into multiple stream objects.

21. A system for identifying a data object in a data file that causes an error in an application running on an operating system, the system comprising:

means for intercepting calls between the application and the operating system, wherein the means for intercepting calls is composed of code stored on a computer-readable storage medium;

means for analyzing the calls to identify an occurrence of the error, wherein the means for means for analyzing is composed of code stored on a computer-readable storage medium; and means for correlating the occurrence of the error with the data object from the intercepted calls to identify the data object that causes the error, means for correlating is composed of code stored on a computer-readable storage medium.

22. The system of claim 21, further comprising:

means for graphically representing the data file, wherein the means for graphically representing is composed of code stored on a computer-readable storage medium;

means for displaying the object locations of each data object in the file, and the time each data object of the data file is processed, wherein the means for displaying the object location is composed of code stored on a computer-readable storage medium; and means for displaying a time line showing the processing of data objects, wherein the means for displaying a time line is composed of code stored on a computer-readable storage medium.

23. The system of claim 21, further comprising:

means for transforming a stream object from the data file into multiple stream objects, wherein the means for transforming is composed of code stored on a computer-readable storage medium;

means for positioning the multiple stream objects into different locations in the data file such that each stream object relates to interactions with the operating system, wherein the means for positioning is composed of code stored on a computer-readable storage medium; and means for updating an object location table in the data file, wherein the means for updating is composed of code stored on a computer-readable storage medium.

24. A computer readable storage medium on which is embedded one or more computer program, said one or more computer programs implementing a method for identifying a data object of a data file that causes an error in an application, said one or more computer programs comprising a set of instructions for:

processing the data file with the application;

intercepting interactions between the application and an operating system; and determining the data object of the data file which causes the error.

25. The computer readable storage medium according to claim 24, the one or more computer programs further comprising a set of instructions for:

transforming the data file to include a plurality of data objects; and processing each of the plurality of data objects.

* * * * *

UNITED STATES PATENT AND TRADEMARK OFFICE
CERTIFICATE OF CORRECTION

| | |
|---|---|
| PATENT NO. | : 7,502,967 B1 |
| APPLICATION NO. | : 11/263357 |
| DATED | : March 10, 2009 |
| INVENTOR(S) | : Jun Li et al. |

It is certified that error appears in the above-identified patent and that said Letters Patent is hereby corrected as shown below:

In column 1, line 16, delete "trail" and insert -- trial --, therefor.

In column 1, line 23, delete "trail" and insert -- trial --, therefor.

In column 2, line 50, delete "staring" and insert -- starting --, therefor.

In column 3, line 19, delete "identity" and insert -- identify --, therefor.

In column 4, line 66, delete "graphic" and insert -- graphical --, therefor.

In column 8, line 29, delete "present" and insert -- prevent --, therefor.

In column 8, line 35, delete "herein." and insert -- therein. --, therefor.

In column 10, line 36, after "for" delete "execution" and insert -- executing --, therefor.

In column 10, line 37, delete "operation" and insert -- operating --, therefor.

In column 10, line 39, delete "operation" and insert -- operating --, therefor.

In column 10, line 51, delete "electronically" and insert -- electrically --, therefor.

In column 10, line 66, delete "may" and insert -- many --, therefor.

In column 11, line 62, in Claim 8, delete "object" and insert -- objects --, therefor.

In column 12, line 43, in Claim 15, after "on a" delete "tangible".

In column 12, line 54, in Claim 16, delete "in" and insert -- to --, therefor.

In column 13, line 18, in Claim 21, delete "means for means for" and insert -- means for --, therefor.

CERTIFICATE OF CORRECTION (continued)
U.S. Pat. No. 7,502,967 B1

In column 13, line 31, in Claim 22, delete "locations" and insert -- location --, therefor.

In column 14, line 19, in Claim 24, delete "program," and insert -- programs, --, therefor.

Signed and Sealed this

Thirtieth Day of March, 2010

David J. Kappos
*Director of the United States Patent and Trademark Office*